Jan. 28, 1941.   R. G. LE TOURNEAU   2,229,754
CLUTCH AND BRAKE MECHANISM
Filed July 12, 1939   2 Sheets-Sheet 1

INVENTOR
R. G. LeTourneau
ATTORNEY

Jan. 28, 1941.                R. G. LE TOURNEAU                2,229,754
                          CLUTCH AND BRAKE MECHANISM
                             Filed July 12, 1939            2 Sheets-Sheet 2
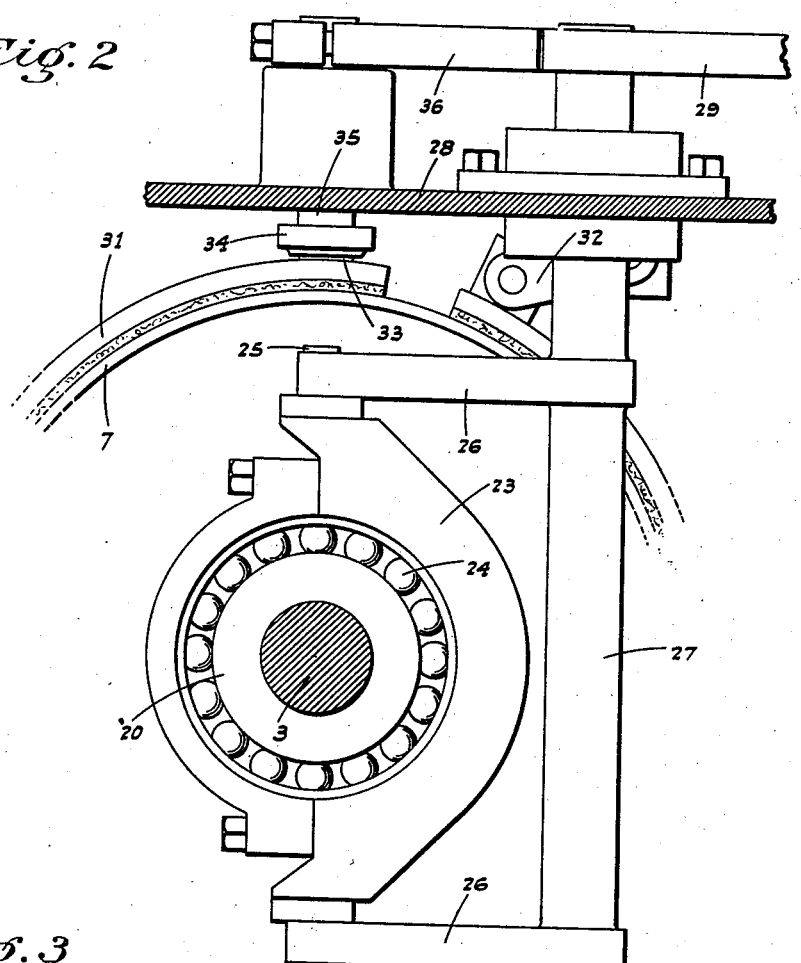
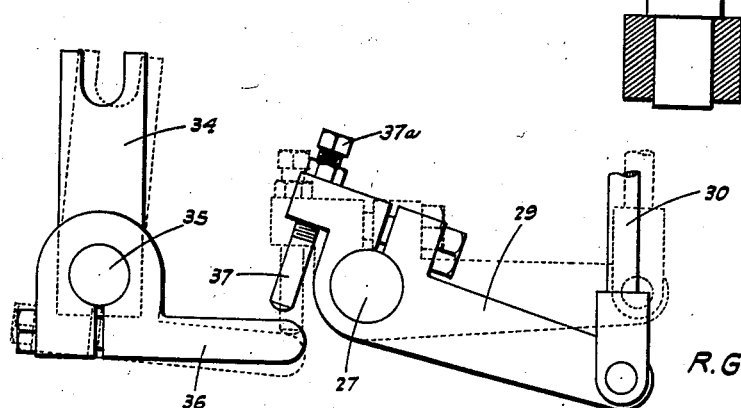
INVENTOR
R.G. LeTourneau
ATTORNEY Patented Jan. 28, 1941

2,229,754

UNITED STATES PATENT OFFICE 2,229,754

CLUTCH AND BRAKE MECHANISM

Robert G. Le Tourneau, Peoria, Ill., assignor to R. G. Le Tourneau, Inc., a corporation of California Application July 12, 1939, Serial No. 284,002

5 Claims. (Cl. 192—17)

This invention relates to clutches for heavy duty service, my main object being to provide a double-cone clutch so designed that the advantages of both the single cone and multiple-disc clutches are retained, while their disadvantages are avoided.

The ordinary cone clutch is spring loaded, the spring being mounted in such a way that there is a possibility of the parts springing or becoming misalined, and also most engines are not designed with sufficient thrust bearing strength at the crankshaft to stand the thrust placed on the shaft when the clutch is pulled out.

Another disadvantage is that a great deal of power is required to disengage the spring loaded clutch, since the conventional compression spring has less power when the clutch is engaged and when the most holding power is required, than when the clutch is disengaged and such power is not needed.

The conventional multiple-disc clutch avoids the above objections, but it has more wearing parts, and there is a tendency for the discs to wear notches in the splines. This prevents the discs from releasing properly, and it is always a problem to get the discs to run perfectly free. Also, the biggest problem in a multiple-disc clutch is to get rid of the heat which is necessarily generated with the in-and-out operation of any clutch.

With my improved clutch the simplicity of the ordinary cone clutch is substantially maintained, but the objectionable spring loading feature is eliminated. Also, the area of the friction faces can be increased to any desired extent without a corresponding and undesirable increase in the diameter of the clutch.

A further object is to provide, without the addition of other than a few parts, an efficient clutch brake, functioning with the disengagement of the clutch so that the speed of the driven shaft can be quickly slowed down so as to synchronize its speed with the next gear, when shifting gears.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is a fragmentary end view showing the throwout and brake applying units.

Figure 3 is a plan view of the cooperating clutch and brake actuating levers in the position occupied when the clutch is engaged.

Figure 1:
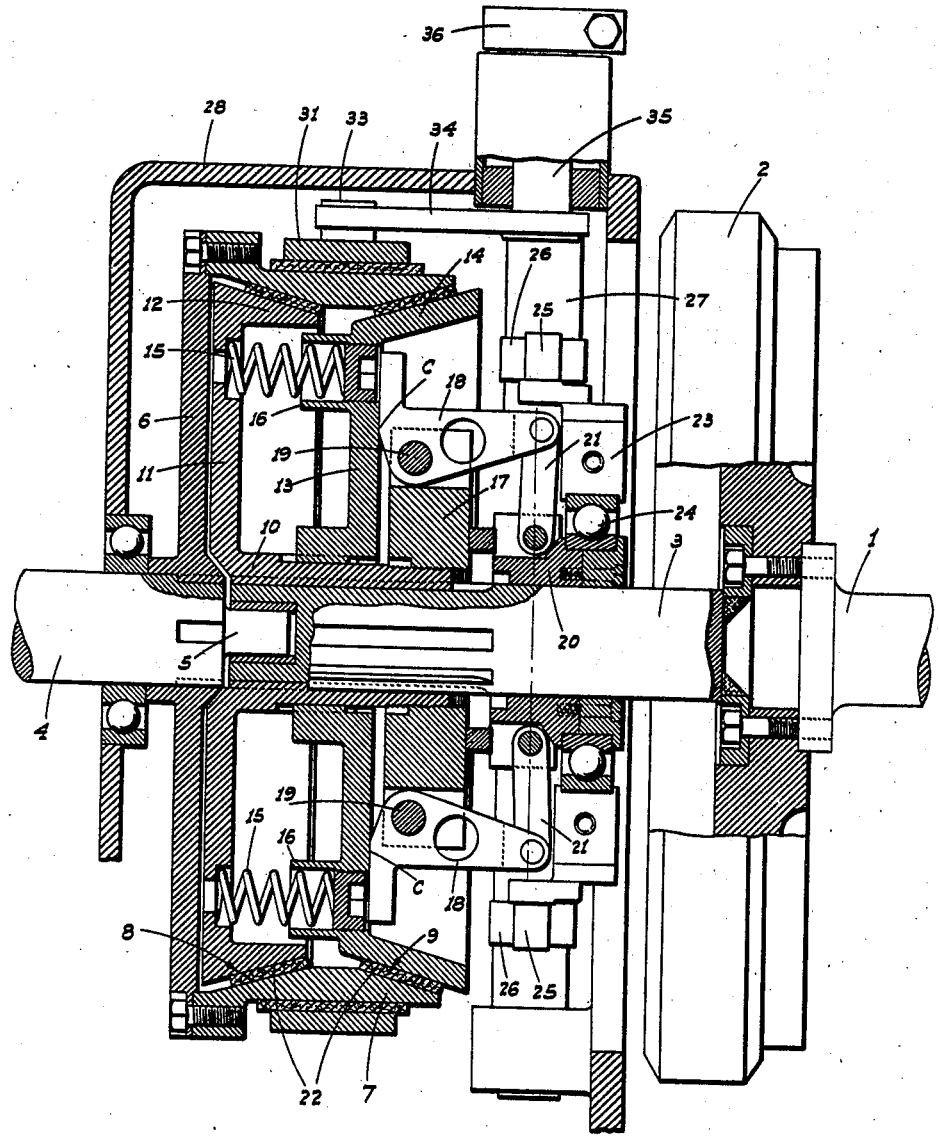
Figure 1 is a sectional elevation of my improved clutch as engaged.

Referring now more particularly to the characters of reference on the drawings, 1 denotes the engine or drive shaft on which the fly wheel 2 is mounted. Secured on the fly-wheel and extending rearwardly in alinement with shaft 1 is an extension shaft 3, while projecting rearwardly from shaft 3 is the driven shaft 4, piloted at its forward end in the rear end of shaft 3 as at 5.

Secured on shaft 4 adjacent shaft 3 is a disc or spider 6 secured on which in overhanging relation to shaft 3 is a band 7 forming the female member of the clutch and having oppositely facing bevel faces 8 and 9, cut at approximately 15° to the axis of the band.

A sleeve 10 is splined on the rear portion of shaft 3 and is rigid with a disc or spider 11 extending outwardly from its rear end, just ahead of disc 6. This disc carries a forwardly facing male clutch-cone 12 cooperating with the bevel surface or seat 8 of the female member 7.

Splined on sleeve 10 intermediate its ends is another disc 13 carrying a male clutch-cone 14 cooperating with seat 9 of the female member. Compression springs 15 between discs 13 and 11, and retained in cages 16, tend to move the discs apart and thus disengage the clutch.

A collar 17 is mounted for axial adjustment on sleeve 10 ahead of disc 13, and supports opposed throw-out fingers 18 which are pivoted intermediate their ends on the collar as at 19 and at their rear ends, radially out from their pivot, have cam surfaces C which bear against disc 13 when the clutch is engaged.

A throw-out collar 20 is slidably mounted on the shaft 3 ahead of sleeve 10 and supports radial links 21 pivoted thereon and on the forward end of fingers 18. The links are arranged on the throw-out collar so that when said collar is shifted along the shaft to its limit of movement toward collar 17 (which it then engages) the links will be slightly beyond a dead center position, as shown in Fig 1.

It will therefore be seen that if the throw-out collar is shifted forward or toward the fly wheel, from a clutch engaging position, the forward end of fingers 18 will move radially in once the links clear dead center, and the cam surfaces C of the fingers will clear the disc 13. The springs 15 can then act to positively move the male clutch elements clear of the female member. When the throw-out collar is shifted rearwardly or in a clutch engaging direction, the pressure of the fingers against the disc 13, pressing the same rearwardly, is transmitted to the disc 11 to pull the same forwardly, by reason of the connection of said fingers with the collar 17, and of the latter with sleeve 10 on which the disc 11 is secured. As a result, both male clutch elements engage their cooperating seats in the female cone member with equal pressures. The movement of the links past dead center insures that the clutch elements will remain properly engaged against the resistance of the springs and without the necessity for any holding means being applied to the throw-out collar. It will be noted from Fig. 1 that the major portion of the weight of fingers 18 lies adjacent the cam edge, so that said fingers are in effect counter-weighted to compensate for any tendency to disengage the clutch by centrifugal force. The adjustment of collar 17 along the sleeve 10 of course provides for the necessary take-up due to wear of the clutch facing bands 22.

The throw-out collar is shifted back and forth by means of a yoke 23 applied thereon ahead of the links 21, with an annular ball bearing 24 therebetween. The yoke is provided with diametrally opposed trunnions 25 engaged by the slotted ends of arms 26 which project radially from a shaft 27 disposed parallel to the yoke to one side of the same; the arms forming the usual fork. The shaft is journaled in the clutch casing 28, and on the outside of the casing carries an operating arm 29 to which a push and pull rod 30 is applied.

It will therefore be seen that I have obtained a much greater area of contact, in a cone type clutch, than can be had with a conventional cone clutch of the same dimensions, and with the use of only about one-fourth as much pressure, to pull the clutch members together, than is necessary with a conventional two-disc clutch.

Non-slipping action, combined with great ease of operation, is thus obtained.

In connection with the throw-out actuating mechanism, I provide a brake for the driven shaft. This comprises a split brake band 31 disposed about the female clutch member 7, which also forms a brake drum. At one end, the band is anchored on the casing 28 as at 32 and at the other end carries a radial trunnion 33. This is engaged by the slotted end of an arm 34 extending forwardly from the band substantially parallel to the shaft 3, and secured on an upstanding shaft 35 journaled in the casing parallel to and transversely spaced from shaft 27. Outwardly of the casing, this shaft carries an arm 36 projecting toward arm 29 and adapted to be engaged by a pin or bolt 37 mounted on arm 29. This pin and arm are so positioned that when arm 29 is turned in a direction to disengage or throw out the clutch, the arm 36 and shaft 35 will be turned by said pin in a direction to cause arm 34 to pull the trunnion 33 about the member 7 in a brake setting direction. The pin 37 is threaded and adjustable in the arm 29 by means of a head 37a thereon, so that the amount of movement of said arm obtained before any brake setting action is had, may be altered to suit.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A cone clutch comprising, with drive and driven shafts, cooperating male and female elements on the shafts, actuating means for the elements to engage and disengage the same, and including a rotatable actuating shaft disposed at right angles to the driven shaft, the element on the driven shaft being formed as an external brake drum, a split band about the drum anchored at one end, an arm applied at one end to the free end of the band and extending substantially parallel to the axis of the drum, a shaft on which said arm is secured at its free end and disposed in spaced and parallel relation to said actuating shaft, and means between said last named shafts to rotate the arm shaft in a direction to cause the arm to pull the band into clamping relationship about the drum with rotation of the actuating shaft in a direction to disengage the clutch elements.

2. A structure as in claim 1, in which said last named means comprises an arm on the actuating shaft, an arm on the last named shaft extending to one side of said actuating shaft and a member on one of said arms in position to cause the last named arm to turn in a brake setting direction with rotation of the actuating shaft arm in a direction to disengage the clutch elements.

3. A structure as in claim 1, in which said last named means comprises an arm on the actuating shaft, an arm on the last named shaft extending to one side of said actuating shaft and a member on one of said arms in position to cause the last named arm to turn in a brake setting direction with rotation of the actuating shaft arm in a direction to disengage the clutch elements, and means to adjust the setting of the member in a direction such as to provide a lag between the movements of said arms and shafts.

4. A clutch comprising, with drive and driven shafts, cooperating male and female clutch elements on the shafts, movable actuating means for the elements to engage and disengage the same, and including a rotatable shaft, a brake drum mounted in fixed relation with one clutch element, a brake member engaging the drum, means to set the member including a rotatable shaft, and means between said shafts to rotate the last named shaft in a brake setting direction with rotation of the first named shaft in a clutch disengaging direction; said last named means comprising an arm on the last named shaft, an arm on the first named shaft overhanging the first named arm and an element on said last named arm to engage the first named arm.

5. A structure as in claim 4, in which said element is positioned to engage the first named arm only after a predetermined rotation of the corresponding shaft in a clutch disengaging direction.

ROBERT G. LE TOURNEAU.